March 12, 1957     T. A. MILLER     2,784,454
MOLD-SUPPORTING SPIDER FOR CASTING MACHINE
Filed Jan. 31, 1955     2 Sheets-Sheet 1

INVENTORS
THEODORE A. MILLER
BY
Oldham & Oldham
ATTORNEYS

March 12, 1957 T. A. MILLER 2,784,454
MOLD-SUPPORTING SPIDER FOR CASTING MACHINE
Filed Jan. 31, 1955 2 Sheets-Sheet 2

INVENTORS
THEODORE A. MILLER
BY
Oedham & Oedham
ATTORNEYS

United States Patent Office 2,784,454
Patented Mar. 12, 1957

2,784,454
MOLD-SUPPORTING SPIDER FOR CASTING MACHINE

Theodore A. Miller, Cuyahoga Falls, Ohio

Application January 31, 1955, Serial No. 485,258

11 Claims. (Cl. 18—34)

This invention relates to mold supports for use in apparatus for casting hollow plastic articles, and is especially useful in machines such as that shown and described in my patent application, Serial No. 457,082, filed September 20, 1954, and entitled, Method and Apparatus for Casting Hollow Plastic Articles.

In the manufacture of hollow plastic articles from a solution or dispersion of thermo-setting plastic material, otherwise known as plastisol, the molds are supported for rotation about a plurality of axes to cause the plastisol to be distributed evenly over the surface of the closed mold, while the mold is first caused to travel through a heated oven and then through a cooling chamber, to gell and then thermoset the plastic material.

The proper supporting of the molds to provide flow of heated air uniformly over all of the mold surfaces and flow of cooling liquid thereover during the manipulation of the molds through the heating oven and cooling chamber while at the same time providing sufficient strength of the support and resistance of the support to rapid changes in temperature, has been difficult.

It has been found desirable, in view of the expense in providing such supports, to provide a support which may be used for supporting molds of different sizes and shapes interchangeably, but the provision of such an interchangeable support has also involved difficulties.

It is an object of this invention to overcome the foregoing and other difficulties by providing a spider or support for holding a multiplicity of molds, while providing free flow of heated air and cooling fluid over their surfaces and at the same time providing a support which will have adequate mechanical strength and resistance to breakage under quick temperature changes.

A further object is to provide such a support of minimum weight.

A still further object is to provide for interchangeably supporting molds of different sizes and shapes on the same support.

These and other objects will appear from the following description and the accompanying drawings.

Figure 1:
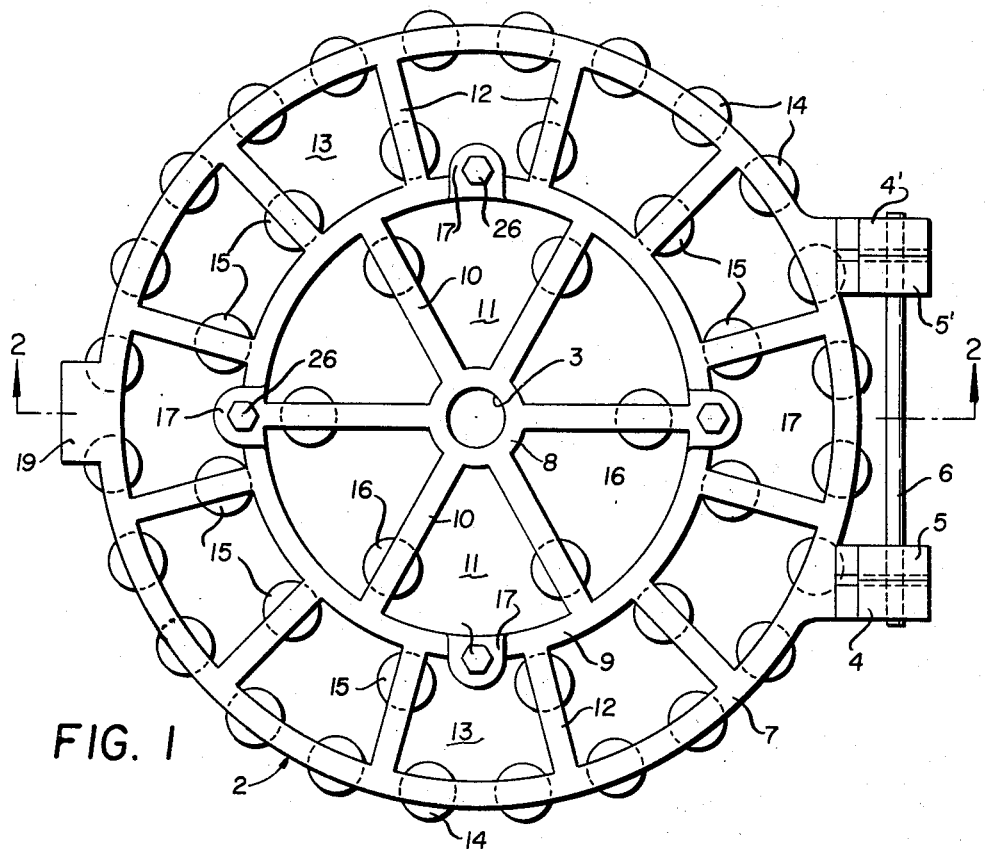
Fig. 1 is a plan view of a support constructed in accordance with and embodying the invention.
Figure 2:
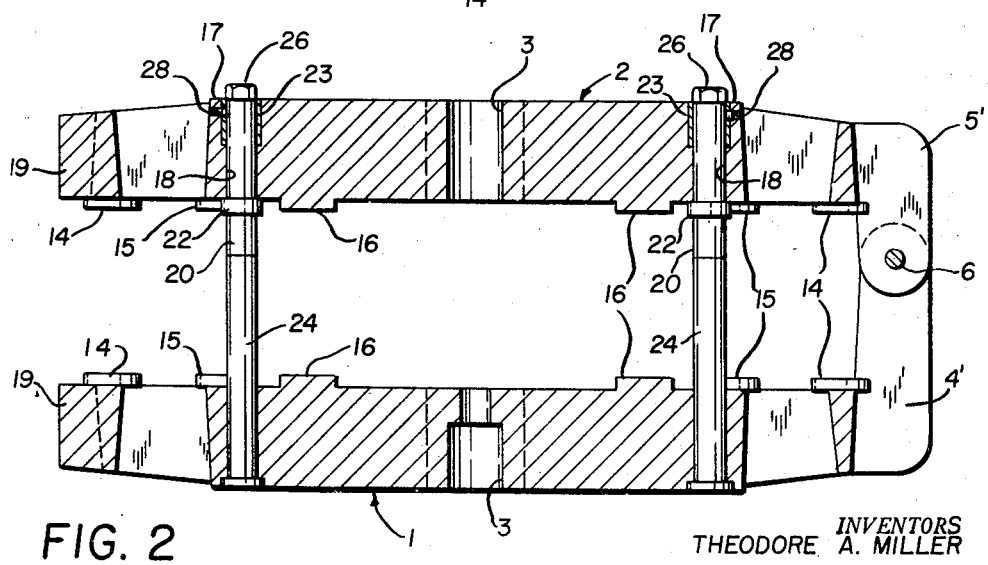
Fig. 2 is a cross-section thereof, taken on line 2—2 of Fig. 1.

Referring to the drawings, the numeral 1 designates the bottom grid in spider member of the mold support, and the numeral 2 designates the top grid member thereof. The bottom grid member has a central hub having a bore 3 for mounting it upon a shaft for rotation of the mold support about its vertical axis. The top grid also has a hub in alignment therewith. Hinge lugs 4, 4' project upwardly from the periphery of the bottom grid member and similar lugs 5, 5' project downwardly from the periphery of the top grid member for hinged connection thereto, a hinge pin 6 being provided for this purpose and extending through hinge apertures in the overlapping lugs. The top and bottom grid members are the same in plan and comprise an outermost peripheral ring or ring-shaped rib 7 to which the hinge lugs are integrally formed, a central hub 8 and an intermediate ring or ring-shaped rib 9 concentric with the hub and the peripheral ring. Spoke-like ribs 10 extend radially from the hub to the intermediate ring 9 in equally-spaced directions, and are integral with the hub and the intermediate ring providing spaces 11 therebetween, of relatively large area for circulating heated air or cooling fluid. Radially-extending ribs 12 extend between the peripheral ring and the intermediate ring and are integral therewith. The ribs 12 are equally spaced and arranged so as not to be linearly continuous with and to be arcuately spaced from the ribs 10 radially opposite the spaces 12. Spaces 13 of large area are provided between the ribs 12 for passage of heated air and cooling fluid therethrough.

Figures 3, 4:
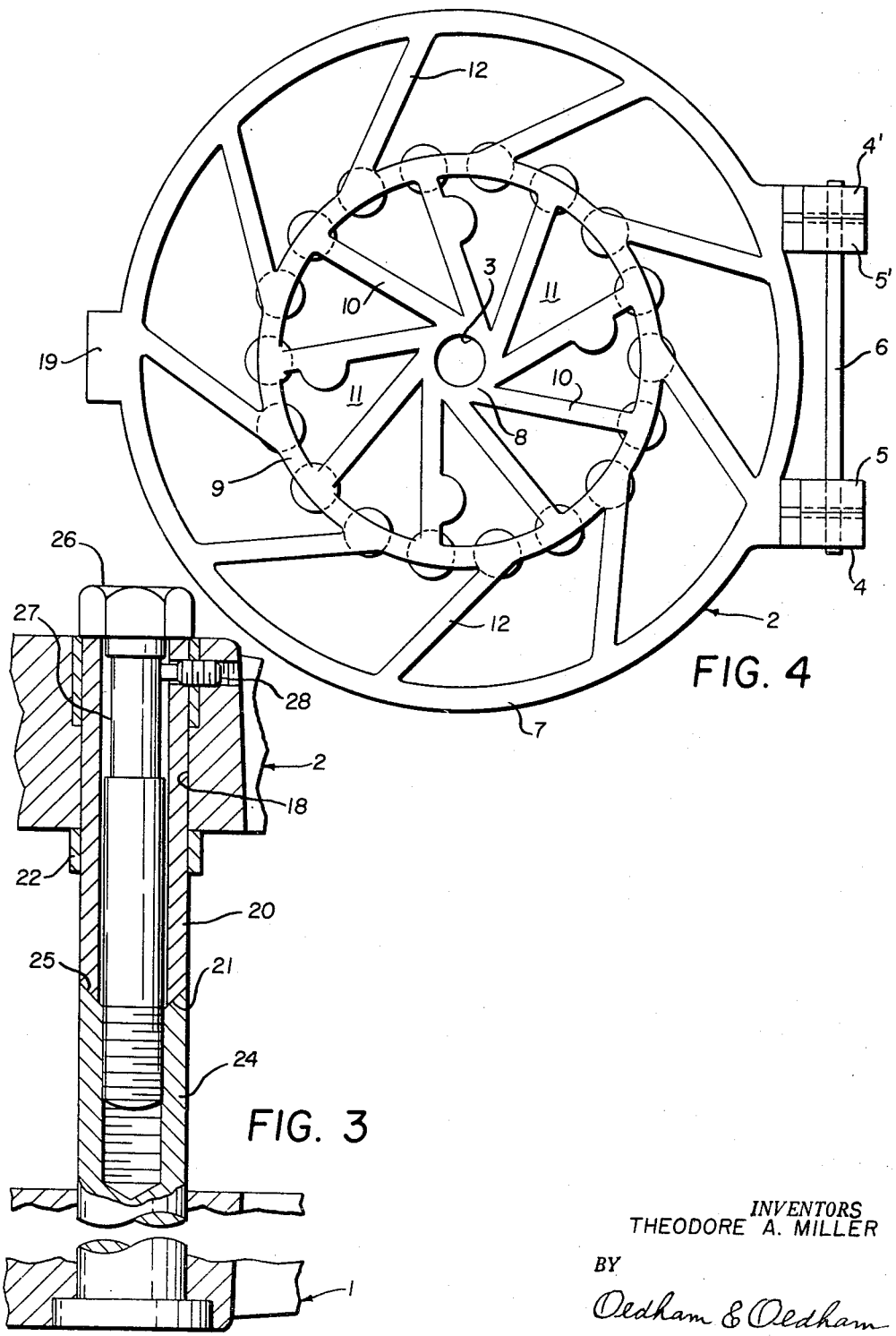
Fig. 3 is a detail sectional view of the mold supporting spider showing the clamping means.
Fig. 4 is a view similar to Fig. 1 showing a modification thereof.

While the ribs 10 and 12 have been shown and described as radially arranged, they may if desired be arranged in a tangential manner as shown in Fig. 4 as this arrangement provides longer ribs between the hub 8 and the concentric ribs 7 and 9 and therefore has greater resistance to breaking under tension caused by rapid cooling. In this arrangement the radiating ribs 10 between the hub 8 and the intermediate annular rib 9 are staggered along the intermediate rib relative to the radiating ribs 12 between the intermediate and outer annular ribs and are inclined oppositely thereto for increased resistance to shrinkage failure. In this form of the invention bosses for supporting molds are shown only on the intermediate rib 19, it being understood that other mold-attaching bosses may be added if desired.

For securing molds to the grids the peripheral ring 7 is provided at equally-spaced intervals thereabout with bosses 14 projecting from the lower face of the top grid and from the upper face of the bottom grid, the bosses on top and bottom grids being in vertical alignment for attachment thereto of mating mold cavities of mold members, the mold cavities being removably attachable thereto, as by clamp members or screws engaging the bosses. Similar bosses 15 are formed on the ribs 12, one on each rib at equal distances from the center of the grid, and other similar bosses 16 are formed, one on each rib 10. The arrangement of the bosses 14, 15, 16 is such that each boss 15 is spaced equally between one of the bosses 16 and one of the bosses 14, and substantially at the center of a straight line intersecting the centers thereof, with the centers of two bosses 14 on the peripheral ring which are separated by three boss spaces thereabout, and the centers of each of which are on straight lines intersecting the center of a boss 16 and the centers of two adjacent bosses 15 defining the base of an isosceles triangle of which the apex is at the center of a boss 16 and the said lines are the sides. Also, the bosses 14, 15, 16 are arranged at equally spaced positions about three concentric circles, the spacing in the inner circles being greater than in the peripheral circle. Furthermore, each boss of the inner circles is equidistant of and between two bosses of the circle outwardly thereof and defines the apex of an isosceles triangle of which the two bosses on the outward circle define the base.

It will be noted that the number of bosses in successive annular rows outwardly are multiples of each other as this arrangement has been found to provide the greatest number of mold cavities to a spider which may be properly heated and cooled. While the central areas of the spider appear more open than the peripheral areas, this is desirable as in the machine which supports and manipulates the spiders, the transmission unavoidably shields the spider in one direction and reduces cooling time at the center of the spider.

closed herein but is to be accorded the full scope of the claims so as to embrace any and all equivalent devices.

Having described our invention, what we claim as new and desire to secure by Letters Patent is:

1. A mechanical action for artificial limb joints comprising a relatively stationary member and a ratchet segment rotatably mounted on the member, a lever rotatably mounted on the member with the rotational axis adjacent to the circumference of the ratchet segment, a locking bar on said lever having opposite curved faces positioned generally perpendicular to the radius from the rotational axis of the lever, said segment having a series of spaced generally radially extending bar receiving notches with faces complementary to the respective faces of the bar when in bar receiving position, said rotational axis of the lever being at a point adjacent a line tangent to an arc about the axis of said segment struck through the centers of the faces of said notch.

2. A mechanical action for artificial limb joints comprising a relatively stationary member and a ratchet segment rotatably mounted on the member on the axis of rotation of the joint, a lever rotatably mounted on the member with the rotational axis adjacent to and exterior of the circumference of the ratchet segment, a locking bar on said lever having opposite faces positioned generally perpendicular to the radius from the rotational axis of the lever and the faces, said segment being subject to a rotative load and having a series of spaced generally radially extending bar receiving notches with faces complementary to the respective faces of the bar when in bar receiving position, said rotational axis of the lever being within an angular distance of a line tangent to an arc about the axis of said segment struck through the centers of the faces of said notch such that the component of the force resulting from application of a rotative load tending to disengage the bar from the notch is less than the frictional force on the respective contacting faces.

3. A mechanical action for artificial limb joints comprising a relatively stationary member and a ratchet segment rotatably mounted on the member on the axis of rotation of the joint, a lever rotatably mounted on the member with the rotational axis adjacent to and exterior of the circumference of the ratchet segment, a locking bar on said lever having opposite arcuate faces positioned generally perpendicular to the radius from the rotational axis of the lever and the faces, said segment having a series of spaced generally radially extending bar receiving notches with arcuate faces complementary to the respective faces of the bar when at bar receiving position, said rotational axis of the lever being within an angular distance of five degrees inside of a line tangent to an arc about the axis of said segment struck through the centers of the faces of said notch.

4. A mechanical action for artificial limb joints comprising a relatively stationary member and a ratchet segment rotatably mounted on the member on the axis of rotation of the joint, a lever rotatably mounted on the member with the rotational axis adjacent to and exterior of the circumference of the ratchet segment, a locking bar on said lever having opposite arcuate faces of radius of curvature determined by the distance between the rotational axis of the lever and the respective face, said segment having a series of spaced generally radially extending bar receiving notches with arcuate faces complementary to the respective faces of the bar, said rotational axis of the lever being at a point within an angular distance of 15 degrees on either side of a line tangent to an arc centered at the axis of said segment and through the centers of the faces of a notch in bar engaging position, the faces of said notches having positions wherein said last faces are in engagement substantially throughout their areas with the respective faces of the bar when in bar engaging position.

5. A mechanical action for artificial limb joints comprising a pair of members wherein one member is adapted for attachment to a natural limb, parallel plates on one of the members, the other of said members comprising a tubular sleeve rotatably mounted on said plates providing thereby an articulating joint for said action, a ratchet segment fixed on said sleeve having a series of spaced generally radially extending notches, a lever pivotally mounted at a center of rotation on said one member, a locking bar fixed transversely on the lever, and an alternator connected between the lever and one of said members adapted to releasably hold said bar out of notch engagement position, said bar having opposite notch contacting faces curved in the same general direction and said notches having opposite curved bar engaging faces complementary to and adapted to engage the respective faces of the bar when in bar engaging position.

6. A mechanical action for artificial limb joints comprising a relatively stationary member adapted for attachment to a natural limb, parallel plates on said member and a tubular sleeve rotatably mounted on said plates providing thereby an articulating joint for said action, a ratchet segment fixed on said sleeve having a series of spaced generally radially extending notches, a lever pivotally mounted at a center of rotation on said member, a locking bar fixed transversely on the lever, a spring on said member normally urging said bar toward a notch engagement position, and an alternator connected between said member and the lever adapted to releasably hold said bar out of notch engagement position, said bar having opposite notch contacting faces of arcuate form and of radius determined by the distance between the respective face and said center of rotation of the lever, said notches having opposite bar engaging faces of arcuate form complementary to and adapted to engage the respective faces of the bar when in bar engaging position.

7. A ratchet resistant mechanical action for artificial limb joints comprising a base, a ratchet segment rotatably mounted on the base and a locking bar having a pivotal mounting on said base, said locking bar having opposite segment-engaging faces curved in the same general direction about the axis of said pivotal mounting, said segment having a series of peripheral bar receiving notches with opposite faces respectively complementary to the faces on said bar.

References Cited in the file of this patent

UNITED STATES PATENTS 2,637,042     Threewit               May 5, 1953

FOREIGN PATENTS 303,664     Germany               Feb. 11, 1918 each equidistant from two of the bosses on said outermost ring and arcuately between them.

9. A mold support for use in an apparatus for casting hollow plastic articles, said support comprising a pair of grid members hinged to each other for securing opposite mating mold cavities between them, while providing for free flow of heated air and cooling fluid about the surfaces of the mold cavities, each grid member comprising a hub, ring-shaped ribs concentrically arranged thereabout in radial spaced-apart relation, radial ribs connecting said hub and said ring-shaped ribs, and cavity-attaching bosses on said grid members, some of said bosses being arranged in an equally-spaced group about the outermost ring-shaped rib, other of said bosses being arranged equally spaced about a plurality of circles concentric with said hub, inwardly of said outermost ring, with each boss located on one of said radial ribs, and the bosses of the innermost circle each defining the apex of an isosceles triangle, the base of which is defined by two bosses on said outermost ring separated from each other by three boss spaces, with the bosses of an intermediate circle each located medially of a side line of said triangle.

10. A mold support for use in an apparatus for casting hollow plastic articles, said support comprising a pair of grid members hinged to each other for securing opposite mating mold cavities between them, while providing for free flow of heated air and cooling fluid about the surfaces of the mold cavities, each grid member comprising a hub, ring-shaped ribs concentrically arranged thereabout in radial spaced-apart relation, radial ribs connecting said hub and said ring-shaped ribs, and cavity-attaching bosses on said grid members, some of said bosses being arranged in an equally-spaced group about the outermost ring-shaped rib, other of said bosses being arranged equally spaced about a plurality of circles concentric with said hub, inwardly of said outermost ring, with each boss located on one of said radial ribs, and the bosses of the innermost circle each defining the apex of an isosceles triangle, the base of which is defined by two bosses on said outermost ring separated from each other by three boss spaces, with the bosses of an intermediate circle each located medially of a side line of said triangle, each of said grid members being integrally formed of a light and strong aluminum alloy.

11. A mold support for use in an apparatus for casting hollow plastic articles, said support comprising a pair of grid members hinged to each other for securing opposite mating mold cavities between them while providing for free flow of heated air and cooling fluid about the surfaces of the mold cavities, and means for clamping the grid members against the mold cavities, said clamping means comprising tubular bodies secured to respective grid members in aligned relation, said tubular bodies having mating conical ends, one of said tubular members being internally threaded and the opposite tubular member supporting a screw rotatable therein for engaging the internally threaded tubular body.

References Cited in the file of this patent

UNITED STATES PATENTS

| | | |
|---|---|---|
| 1,998,897 | Kay | Apr. 23, 1935 |
| 2,259,430 | Soderquist | Oct. 14, 1941 |